E. R. FINN.
EGG POACHER.
APPLICATION FILED JAN. 6, 1920.
1,397,318.
Patented Nov. 15, 1921.
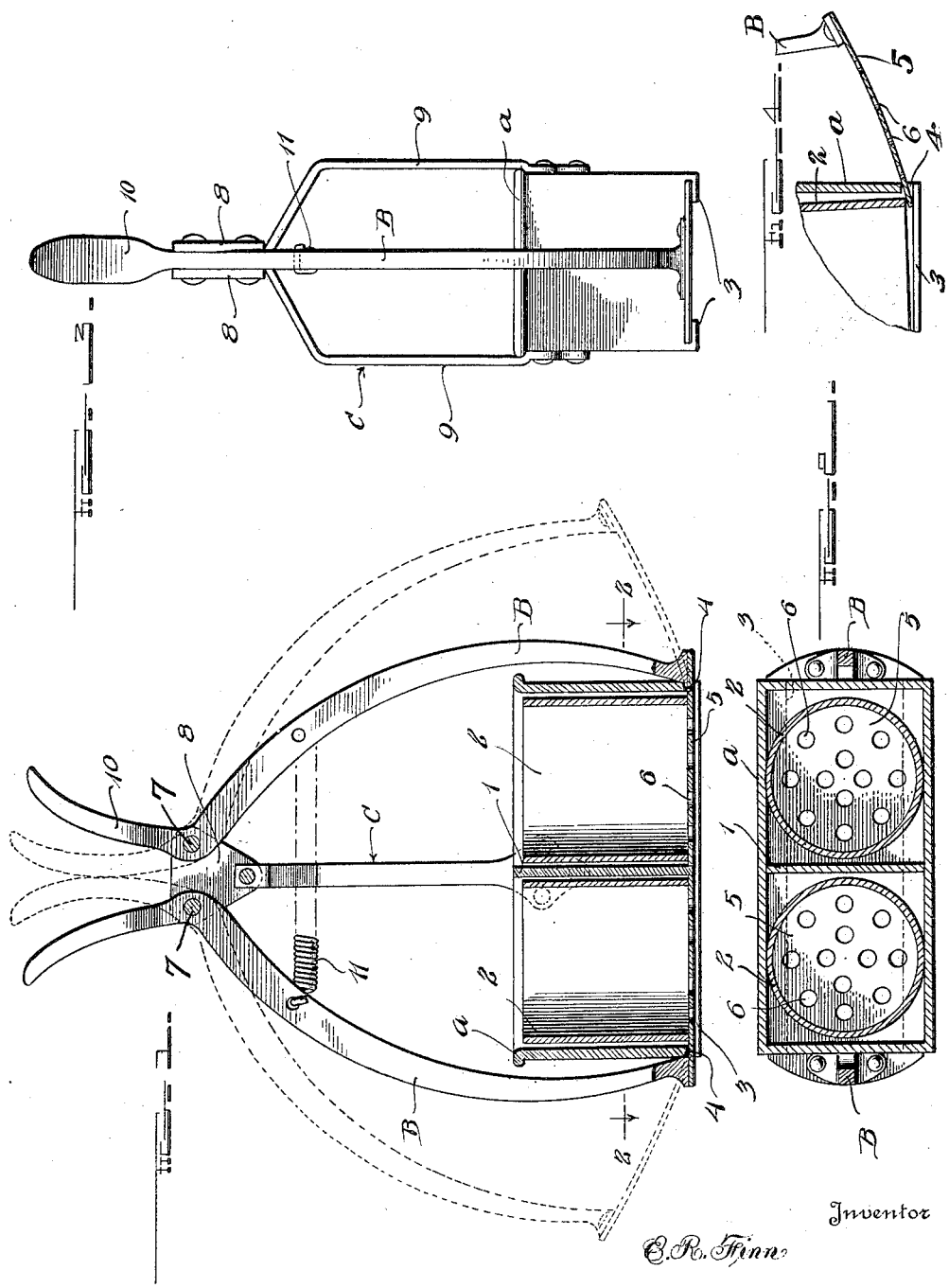

UNITED STATES PATENT OFFICE.

ELMER R. FINN, OF POCATELLO, IDAHO.

EGG-POACHER.

1,397,318.  Specification of Letters Patent.  Patented Nov. 15, 1921.

Application filed January 6, 1920. Serial No. 349,666.

*To all whom it may concern:*

Be it known that I, ELMER R. FINN, a citizen of the United States, residing at Pocatello, in the county of Bannock and State of Idaho, have invented certain new and useful Improvements in an Egg-Poacher, of which the following is a specification.

This invention relates to utensils for poaching eggs.

The principal object of the invention is to provide a utensil for poaching eggs which will prevent the yolks from breaking and the whites of the eggs from spreading during submersion in the water used for poaching, and wherein means are provided for drawing off the water when the eggs are poached in order to facilitate transferring the eggs directly to slices of toast.

Another object of the invention is to provide a poacher of the type indicated wherein the parts may be readily cleaned and which is very durable and which may be easily manufactured in large quantities at relatively small cost.

With these objects in view and others which will appear as the nature of the invention is better understood, the invention comprises the novel features of construction and arrangement of parts, which will be more fully described hereinafter and set forth with particularity in the claims appended hereto.

In the drawings wherein is illustrated the preferred embodiment of the invention;

Figure 1 is a side elevation of the utensil with the casing and egg cup in section.

Fig. 2 is a section on the line 2—2 of Fig. 1.

Fig. 3 is an end elevation of the utensil, and

Fig. 4 is a fragmentary sectional detail showing the inner edge of one of the blades as positioned under the outer edge portion of the cups complemental thereto, when the blade has been moved to position outwardly of the casing.

Referring to the drawing, wherein similar characters of reference designate corresponding parts in the several views thereof, the letter *a* indicates an elongated casing, substantially rectangular in form, open at its top and bottom sides, and divided to provide compartments by means of a transversely disposed vertically extending partition wall 1 connecting the opposite side walls of the casing and extending medially thereof between the opposite end walls of the same. The lower edges of the opposite side walls of the casing *a* are formed to provide inturned right angular flanges 3 coextensive with the length thereof, and supported on these flanges 3 within the said compartments are a pair of open ended cylindrical containers or egg receiving cups 2, the outer walls of which are arranged in close relation with respect to the opposed portions of the side walls of the casing. The opposite end walls of the casing are cut away immediately above the flanges 3, as at 4, to admit of the entrance thereto of slidable members 5 which are guided by the flanges 3 during their movement beneath the lower open end of the containers or cups 2. These members or blades 5 are preferably formed of flexible metal, and perforated, as at 6, to provide for a series of openings for the drawing off of water from the containers or cups 2, and are secured at their outer ends to upwardly extending arcuate arms B, which are pivotally connected, as at 7, between two plates 8 which are mounted on a supporting member C having its opposite arms 9 rising medially of the casing. The arms B have hand gripping portions 10 extending angularly therefrom, and are normally held spread apart by means of a coiled spring 11 which extends between the arms B below the pivoted ends thereof, so that the members or blades 5 on the lower ends of the arms B are normally positioned beneath the containers or cups 2.

In the operation of the device thus provided, and with the parts thereof as normally positioned in full lines in Fig. 1, eggs are broken and their contents dropped into the containers or cups 2, and the device is then suspended or otherwise emersed in boiling water for the poaching of the eggs. When the poaching operation is completed, the device is raised out of the boiling water, and the surplus water allowed to drain from the containers or cups 2 through the openings 6 of the members or blades 5, after which, the hand grips 10 are pressed together for swinging the arms B outwardly against the tension of the spring 11, whereby to withdraw the blades 5 from their position beneath the lower ends of the containers or cups 2 for the dropping of the poached eggs therein onto a platter, or onto toasted bread arranged thereon for their reception, and upon the release of the hand grips 10, the arms B will be drawn toward each other by the coiled spring 11 and the blades 5 again moved into their normal position beneath the cups, the forward edge of the blades 5 being always engaged on the flanges 3 and under the edges of the cups 2.

As many changes could be made in the above construction and many apparently widely different embodiments of this invention could be made without departing from the scope thereof, it is intended that all matters contained in the above description or shown in the accompanying drawings shall be interpreted as illustrative and not in a limiting sense. It is also to be understood that the language used in the following claims is intended to cover all the generic and specific features of the invention herein described and all statements of the scope of the invention, which, as a matter of language might be said to fall therebetween.

What is claimed is:

1. A utensil for poaching eggs including a supporting member, an egg cup supported by said member and having an open bottom, a longitudinally slidable closure for the open bottom of the cup, and an actuating member pivotally secured to the supporting member and connected with the closure for withdrawing the latter from the open bottom of the cup.

2. A utensil for poaching eggs including a supporting member, an egg cup supported by said member and having an open bottom, a longitudinally slidable closure for the open bottom of the cup, an actuating member pivotally secured to the supporting member and connected with the closure for withdrawing the latter from the open end of the cup, and means normally retaining the closure in operative position at the open bottom of the cup.

3. A utensil for poaching eggs including a supporting member, a plurality of egg cups supported by said member and having open bottoms, separate longitudinally removable closures for the open bottoms of the several cups, and independently movable actuating members pivotally secured to the supporting member and connected with the respective closures.

4. A utensil for poaching eggs including a supporting member, a plurality of egg cups supported by said member and having open bottoms, an independently slidable closure for the open bottom of each cup, an independently operable actuating member connected with each closure and pivotally mounted upon the support for effecting withdrawal of the closure from the cup, and means normally tending to move the closures to operative position relative to the open bottoms of the cups.

5. A utensil for poaching eggs including a casing, a supporting member carried thereby, egg cups mounted in the casing, longitudinally movable closures for the lower open ends of the cups, arms pivotally connected with the supporting member and having connection with the closures for effecting independent operation thereof, and spring means connecting the several arms normally maintaining the closures in operative position.

6. A utensil for poaching eggs including a casing, a supporting member carried thereby, egg cups mounted within the casing, longitudinally movable closures for the lower ends of the cups, means for guiding such closures into operative position, arms pivotally connected to supporting members and having connection with the closures for effecting independent operation thereof, and spring means connecting the several arms for normally maintaining the closures in operative position.

7. A utensil for poaching eggs comprising an elongated casing, a supporting member carried thereby, egg cups mounted within the casing, longitudinally movable closures for the lower ends of the cups, means for guiding such closures into operative position, arms pivotally connected to supporting member and having connection with the closures for effecting independent operation thereof, and spring means connecting the several arms for normally maintaining the closures in operative position.

8. A utensil for poaching eggs, comprising a substantially rectangular casing open at its top and bottom ends, a supporting member carried by said casing, egg cups mounted within said casing, inturned flanges formed along the bottom side edges of said casing and spaced below the lower ends of said egg cups, longitudinally movable and flexible closures for the lower ends of said cups and slidable along the upper faces of said flanges in movement to and from operative position, arms pivotally connected with the supporting member and having connection with the closures for effecting independent operation thereof, and spring means connecting the several arms for normally maintaining the closures in operative position.

In testimony whereof, I affix my signature hereto.

ELMER R. FINN.